UNITED STATES PATENT OFFICE.

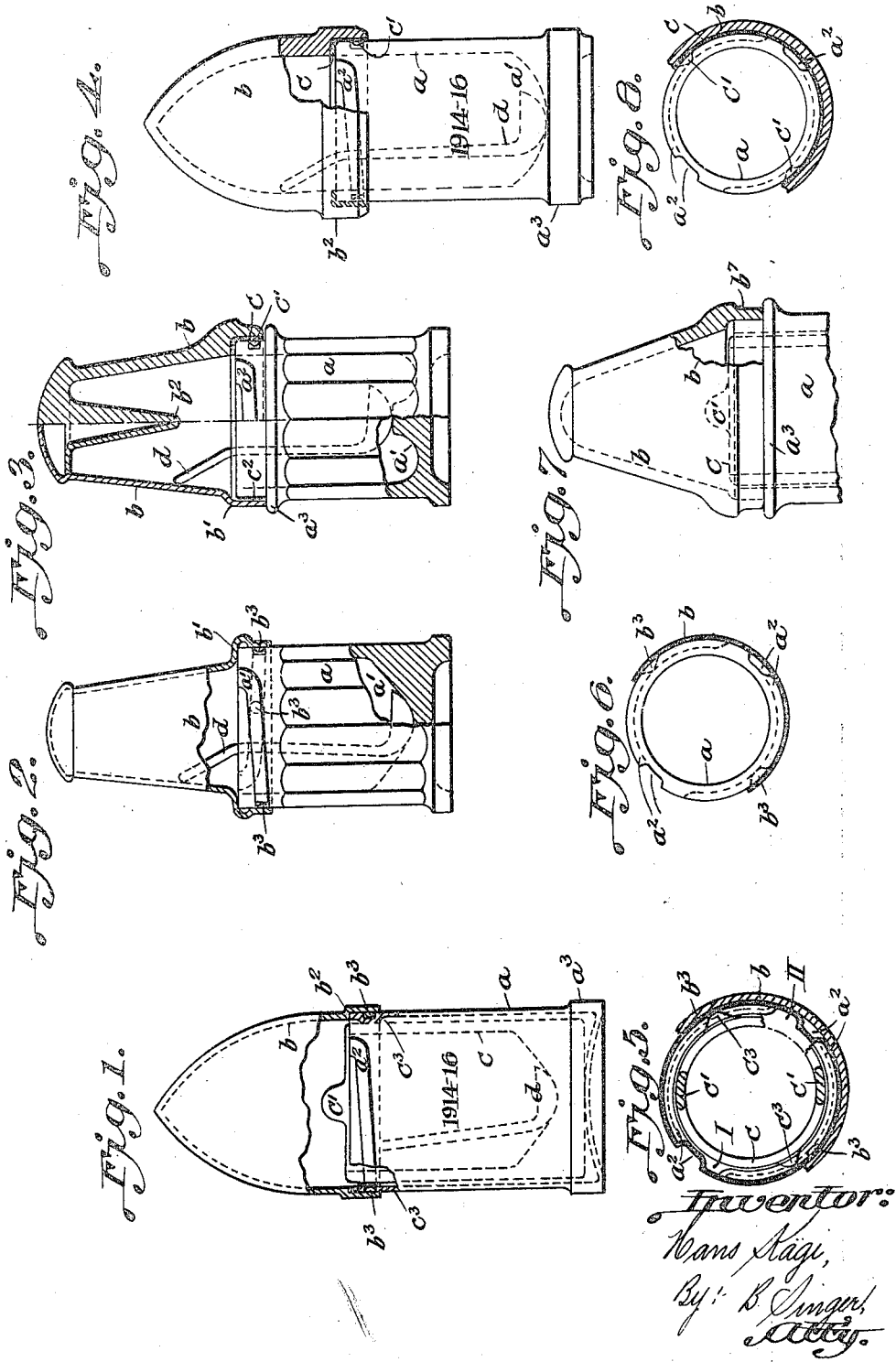

HANS KÄGI, OF WINTERTHUR, SWITZERLAND.

POT FOR MUSTARD, JAM, MARMALADE, HONEY, &c.

1,241,221. Specification of Letters Patent. Patented Sept. 25, 1917.

Application filed February 18, 1916. Serial No. 79,165.

*To all whom it may concern:*

Be it known that I, HANS KÄGI, a citizen of the Swiss Confederation, residing at Winterthur, Schlosshofstrasse No. 26, Switzerland, have invented new and useful Improvements in Pots for Mustard, Jam, Marmalade, Honey, &c., of which the following is a specification.

The pots for mustard, jam, marmalade, honey and so on used on the tables of public houses, hotels, etc., have a good many drawbacks the principal of which consists in that they are open and easily accessible to air, dust, impurities, insects, etc., and the contents soon dries, gets an unsightly appearance and becomes unpalatable.

The principal object of the present invention is to provide a new and improved pot for mustard (especially the so called German mustard) jam, marmalade, honey having an airtight cover which prevents the access of impure and dry air, of dust and of insects to the contents of the pot.

A further object of the invention is to provide a pot for the said purpose having a cover in which the spoon with which the contents of the pot is to be fetched finds easily place in such a manner that the upper end of the handle of the spoon is always well above the contents of the pot and cannot get covered therewith, even when the pot is filled to the top.

The present invention comprises other features which will appear in the course of the subjoined description.

Reference is to be had to the accompanying drawings forming part of this specification.

In the drawings.

Figure 1 illustrates in an elevational side-view one form of the new pot having the outward appearance of a shrapnel shell parts being shown in section.

Fig. 2 shows a second form of the pot having a metallic cover, and a non-metallic base.

Fig. 3 shows two other forms of the device one on each side of the middle line.

Fig. 4 shows a form similar to that shown in Fig. 1 in a side view parts being shown in section.

Fig. 5 is a cross-section of Fig. 1 parts being shown in a top view.

Fig. 6 shows the device shown in Fig. 2 in a cross-section.

Fig. 7 shows the top part of a pot of wood having a container of glass, parts being in section.

Fig. 8 is a cross-section of the pot shown in Fig. 4.

The device shown in Figs. 1 and 5 comprises a casing $a$ and a cover $b$. Casing $a$ and cover $b$ have the appearance of a shrapnel-shell. They may be made of any suitable material for instance metal, glass, porcelain and so on. The casing $a$ is provided with a ring $a^3$ and the cover $b$ with a rim $b^2$. Within the casing $a$ a cup $c$ of non-metallic material preferably of glass is arranged which is provided with two studs $c^3$ protruding outwardly and arranged on the side wall of the cup directly opposite each other. The casing $a$ is provided with two ribs. Protruding inwardly between the two ribs there are two spaces I and II through which the studs $c^3$ may be introduced by inserting the cup $c$ into the casing $a$. By turning the cup $c$ for about 90° the studs pass under the ribs and the parts $a$ and $c$ are firmly held together. On the outer side of the casing $a$ I provide in the ribs two grooves $a^2$ running in helicoidal lines and on the cover $b$ I provide two studs or projections $b^3$ adapted to engage said grooves $a^2$ in such a manner that by introducing the said projections $b^3$ into the said groove $a^2$ and by turning the parts $a$ and $b$ with reference to each other a shoulder on the cover $b$ is tightly pressed against the top edge of the casing $a$ whereby an air-tight joint is obtained. The cup $c$ is provided with two lugs $c^1$ by means of which it may be easily attached to and detached from the casing $a$. In the cup $c$ there is a spoon $d$ by means of which the contents of the cup may be fetched. The handle of the spoon is made long enough that it may be easily grasped even when resting on the bottom of the cup $c$. On the other hand the cover $b$ is made high enough that the handle finds place in it even when the cup is filled up to the top and when the spoon rests on the top of the contents.

Fig. 2 shows the preferred form of my invention. The device comprises a cup $a$ of non-metallic material for instance glass or porcelain and a cover $b$ of metal. Near the top of the cup $a$ there are two grooves $a^2$ diametrically opposite each other and extending over about half of the circumference. The grooves $a^2$ run in a helicoidal line and end in grooves running in axial direction of the cup $a$. The cover $b$ is provided with a shoulder $b^1$ and with a rim which is provided with two studs $b^3$ adapted to enter the said grooves $a^2$ in such a manner that by inserting the studs $b^3$ into the grooves $a^2$ and by turning the cover $b$ for about 90° the shoulder $b^1$ of the cover $b$ is firmly pressed on the top edge of the cup $a$, which is firmly ground to insure a tight joint. The cover $b$ is made hollow and high enough that the spoon $d$ finds place in it even when resting on the top of the contents of the entirely filled cup $a$. The bottom of the cup $a$, is conical. I attain by this particular shape of the bottom that the spoon $d$ cannot enter too far into the cup, and the upper end of the handle of the spoon cannot get covered by the contents of the pot.

In the construction shown in Fig. 3 the cup $a$ which may be made of glass or porcelain is provided at its bottom with a centrally arranged rest $a^1$ for the spoon $d$. The cover may be made either as shown to the left or to the right hand side of the middle line. The cover $b$ shown to the left is made of metal and is provided with a rim $b^1$ which fits tightly on a metal ring $c^2$ fixed to the cup $a$. The cover $b$ on the right hand side of the middle line is made of glass or porcelain and it is provided with a metal ring $c$ of angular cross section which is arranged in a recess of the cover $b$. Ring $c$ is provided with studs $c^1$ engaging the grooves $a^2$ of the cup $a$ as described with reference to Fig. 2. In each case the cover $b$ is provided with the cone $b^2$.

The pot shown in Figs. 4 and 8 has the outward appearance of the pot shown in Fig. 1 viz. the shape of a shrapnel-shell or the like. The cup $a$ and the cover $b$, are made of glass or porcelain. In a recess of the cover $b$, there is a ring $c$ having studs $c^1$ engaging grooves $a^2$ on the outer wall of the cup $a$.

The device shown in Fig. 7 comprises a hollow base of wood and a cover $b$ of wood. The cover $b$ fits tightly on a rim of the cup $a$ and rests on a flange $a^3$. In the base a cup $c$ of glass or porcelain is arranged in which the mustard is stored. The cup $c$ corresponds in all respects to that shown in Fig. 1 but there are no studs $c^3$ and the cup $c$ rests loose in the base $a$.

While I have illustrated and described several practical embodiments of my invention, it is to be understood that the latter is not limited to the forms shown but may be embodied in many other forms, and that many modifications may be made in the forms illustrated without departing from the spirit of the invention, for instance the cone $b^2$, the conical bottom, $a^1$, or the rest $a^1$ may be made in all the forms represented in the drawing where the said parts are not shown, etc.

What I claim and wish to secure by Letters Patent is:

A pot for mustard, jam, marmalade, honey and the like, comprising in combination, a casing adapted to house a spoon, a cover on said casing, studs on said cover, a cup, lugs on said cup, and ribs on the inside of said casing, which constitute grooves on the outside of the casing, said inside ribs engaging said lugs on the cup, and said outside grooves receiving said studs on the cover for forming a joint, substantially as described and for the purpose set forth.

In testimony whereof I affix my signature in presence of two witnesses.

HANS KÄGI.

Witnesses:
CARL GUBLER,
BEUTA C. GROB.